United States Patent Office 3,432,758

Patented Mar. 11, 1969

3,432,758

AUTOMATIC SIGNAL SEARCHING RECEIVER

André Charles Robert, Eaubonne, and Jacques Tauzia, Suresnes, France, assignors to Sud-Aviation Societe Nationale de Constructions Aeronautiques, Paris, France Filed Oct. 23, 1965, Ser. No. 503,604
Claims priority, application France, Jan. 14, 1965, 1,863
U.S. Cl. 325—420 11 Claims
Int. Cl. H04b *1/16;* H03d *7/16*

ABSTRACT OF THE DISCLOSURE

Receiver which automatically searches for signal if signal disappears. Employs low frequency oscillator which generates two voltage levels. Also employs relay and summing amplifier.

This invention relates to automatic frequency control devices for electronic frequency-controlled receiving apparatus, and more particularly for apparatus of this kind receiving radio signals.

In a superheterodyne receiver of data transmitted in the form of an amplitude-, frequency- or phase-modulated carrier wave, of the kind comprising a plurality of frequency-changer-stages having a mixer and a local oscillator the frequency of which is adjustable for the first stage and frequency-modulatable responsively to a direct current voltage for the last of the remaining stages, which are followed respectively by selective amplifiers centered on increasingly narrower pass-bands, if the carrier frequency is liable to fluctuation the signals issuing from the last-stage mixer may undergo a frequency shift causing them to fall wholly or in part outside the very narrow pass-band of the last selective amplifier, so that the final device associated to the receiver will no longer receive any data, or only curtailed data. The function of automatic frequency control is to continuously frequency-centre the signals issuing from the last mixer upon the pass-band of the last amplifier.

Attempts have been made to achieve such automatic frequency control in a superheterodyne system by controlling the frequency of the local oscillation of the last frequency changer stage by means of a DC voltage issuing from the discrimination of the centre frequency of the signal received. The last selective amplifier and the local oscillator of the last stage have been interconnected by means of a frequency control loop consisting of a frequency discriminator followed by a DC amplifier. In this way, there is injected into the local oscillator of said last stage a DC error voltage which is a function of the difference between the frequency of the signal obtained from the output of said last selective amplifier and the adjustment frequency. However, if transmission is interrupted, the frequency of the signals issuing from the local oscillator becomes a random frequency and it is possible that upon resumption of the transmission the signal issuing from said oscillator falls outside the pass-band of said last selective amplifier.

With a view to restoring reception in the case of such superheterodyning with frequency control, recourse has been had to a frequency sweep in the absence of a signal, using a very low frequency voltage injected into the local oscillation of the last frequency changer. There has accordingly been connected into the frequency control loop an adder which is connected to the DC amplifier and to the local oscillator of the last stage and which receives this error voltage together with the voltage delivered by a very low frequency auxiliary oscillator of which the signal, after being routed through the last frequency changer stage—if it is operative—and the control loop is present in said adder in opposite phase to the signal emitted at that instant by said auxiliary oscillator. Thus, in the absence of a significant signal and with no error signal present, the frequency of said local oscillator will vary slowly and periodically responsively only to the voltage of said auxiliary oscillator until, on the appearance of a transmitted signal, the beat signal then issuing from the last stage mixer falls within the pass-band of the last selective amplifier. The receiver will then lock on.

With this kind of design, in order that the auxiliary oscillator may perform in full its function of frequency sweeping in the absence of a transmitted signal, it must deliver a high output voltage which, during transmission, generates in the receiver output means strong spurious signals liable to mask the information to be received.

Thus, the methods and apparatus resorted to heretofore have various drawbacks which, when the carrier wave frequency, modulated for data transmission, is liable to fluctuate, may result, at the reception end, in amputation of part of the information, in total interruption thereof, or in a strong spurious signal which overloads and masks it.

With a view to overcoming these drawbacks and accordingly ensuring, in the presence of transmitted signals, continuous control of reception without strong spurious signals, and, on the disappearance of such signals for any cause whatsoever, extensive scanning aimed at picking them up, the present invention has for its object an improvement to the aforesaid method of superheterodyning with frequency control and frequency sweeping by means of a very low frequency voltage, consisting in generating two voltage levels at said very low frequency and in injecting into the local oscillation of the last frequency changer either the higher very-low-frequency voltage in the absence of a significant signal, or the sum of the lower very-low-frequency voltage plus the error voltage resulting from discrimination of the received signal, when a significant signal is transmitted.

The invention further has for its object an automatic frequency control device for performing the method hereinbefore specified in a superheterodyne receiver of which the last selective amplifier output is connected to the local oscillator of the last frequency changer stage of said receiver by means of a frequency control loop comprising in series a frequency discriminator and an adder receiving the voltage delivered by a very low frequency auxiliary oscillator and controlling the frequency of said local oscillator, which is of the kind in which the frequency is a function of a control voltage, into which device said auxiliary oscillator delivers two very low frequency voltages, one being a high voltage and the other a low but non-null voltage, commutator means being provided for applying to said adder said high voltage in the absence of a significant signal and said low voltage when a significant signal is transmitted.

The commutator means are preferably selective over a frequency band containing the auxiliary oscillator frequency band, and said means apply the high very-low-frequency voltage when the voltage at the frequency of said auxiliary oscillator that is present on the control loop is high, and apply said low very-low-frequency voltage when said control loop voltage is low.

The invention likewise encompasses industrial applications of the automatic frequency control method and apparatus disclosed hereinabove, more particularly in electronic frequency-controlled receiver apparatus and most notably in those of such apparatus which receive radio signals such as the telemetry signals transmitted from missiles or artificial satellites, or by microwave links, or the echoes or retransmissions from telecommunication elay satellites, as well as in coding and transposing de-ices, or in special signal generator regulating apparatus.

The description which follows with reference to the iccompanying non-limitative exemplary drawings will ;ive a clear understanding of how the invention can be :arried into practice.

Figure 1:
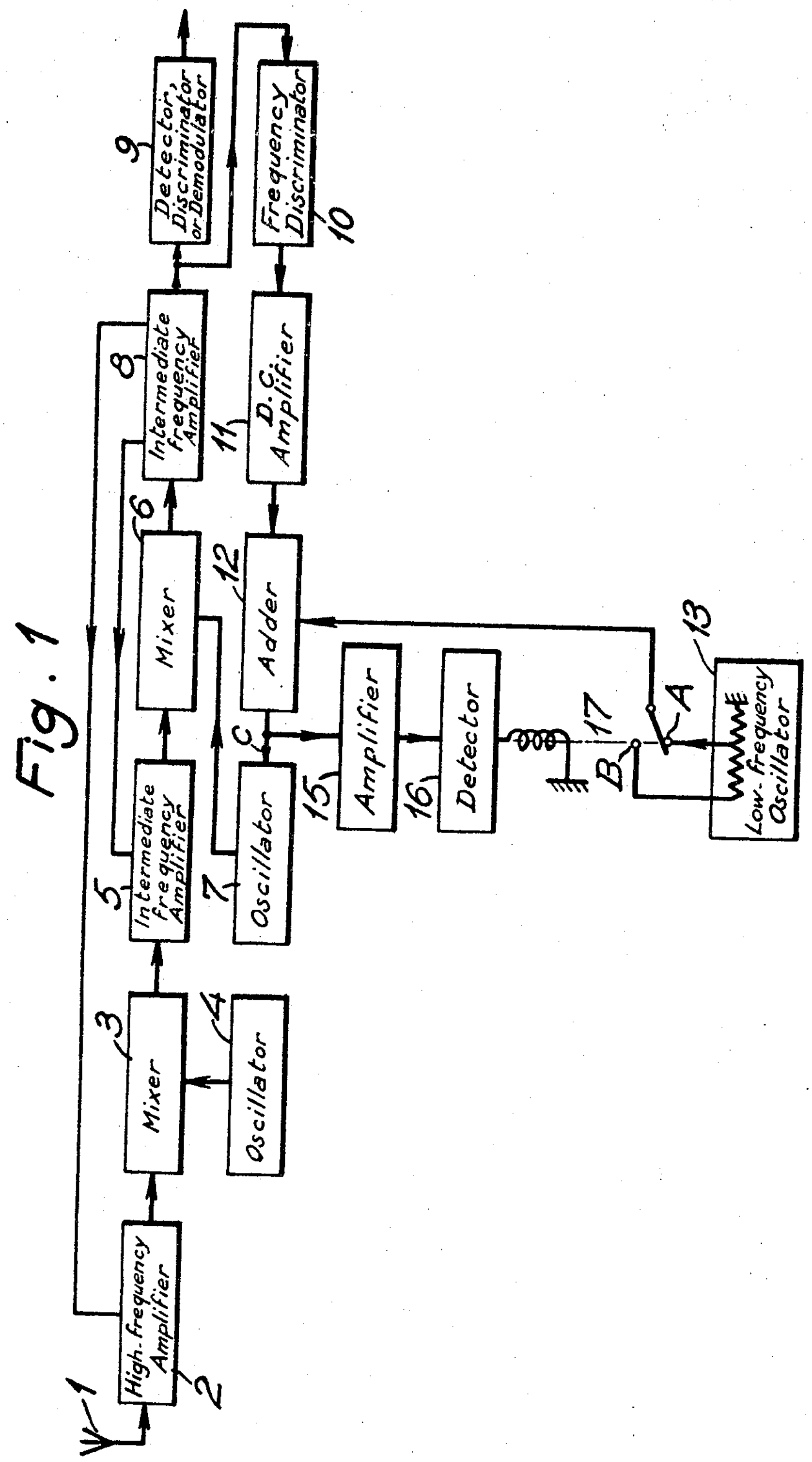
FIG. 1 is a block diagram of a superheterodyne re-:eiver according to the invention.

FIG. 1 is the block diagram for a radio signal receiver intended, say, for receiving signals transmitted by a missile or a satellite and comprising an antenna 1, a high frequency amplifier 2, a first mixer 3, a first local oscillator 4, a first intermediate frequency amplifier 5, a second mixer 6, a second local oscillator 7 and a second intermediate frequency amplifier 8. The function of the first local oscillator 4 is to generate in the mixer 3, by beating with the received signal, a signal the frequency of which is contained within the pass-band of intermediate frequency amplifier 5. This local oscillator is generally intended to permit manual scanning of a wide frequency range so as to determine the wavelength of the signal to be received. This applies in particular to radio broadcast receivers. This oscillator will be referred to hereinafter as the local master oscillator.

The gain obtained at the output of the first intermediate frequency amplifier 5 is insufficient to permit satisfactory reception of low-level transmissions, and for this reason recourse is usually had to a second local oscillator or "secondary oscillator" 7 which operates in the mixer 6 on the signal issuing from the first intermediate frequency amplifier 5 whereby to produce a transposed signal which is then injected into a second intermediate frequency amplifier 8, generally having a narrower pass-band, in order to increase the gain in the reception channel and improve sensitivity. Recourse is sometimes even had to a third secondary local oscillator, a third mixer and a third local amplifier in order to further increase the sensitivity of the receiver. As is well known, each "local oscillator/mixer" unit constitutes a frequency changer stage and each intermediate frequency amplifier is selective, with the frequency bands becoming increasingly narrow from the first stage through to the last.

In theory, for receiving radio signals, only local master oscillator 4 would be of variable frequency, with the remaining local oscillators being secondary oscillators of fixed frequency. However, for phase-setting or for frequency centering correction reasons, provision is sometimes made for enabling the frequency of a secondary local oscillator to be varied slightly. Such an oscillator is then known as being of the type which is frequency-modulatable responsively to a DC voltage, and is known as a voltage controlled oscillator or V.C.O.

The output signal from intermediate frequency amplifier 8 is then injected into an element 9 which delivers the significant signal. The nature of this element 9 will be dependent upon the type of modulation to be received. It will take the form of a detector if an amplitude modulated transmission is involved, or a discriminator if frequency or phase modulation is involved. Although such a receiver may be regarded as conventional, on the other hand when it comprises only elements 1 to 9 it may, in some cases, raise operating difficulties; for when it is a question, for example, of receiving telemetry signals transmitted by a satellite, the carrier frequency will vary at the outset due to satellite temperature fluctuations, and will vary further on reception by reason of the Doppler effect. These variations in the carrier frequency produce a frequency shift in the signals entering the intermediate frequency amplifier 8. In addition, frequency drift in local oscillator 4 or 7, or in both, will have the same effect.

A frequency shift in the signals issuing from mixer 6 will cause these signals to fall wholly or partly outside the pass-band of intermediate frequency amplifier 8. This in turn will either cause reception to be cut off or the information to be amputated, whence the need to take steps to ensure that the signal issuing from mixer 6 is at all times frequency-centered upon the pass-band of amplifier 8. This is the function of automatic frequency control.

This requirement is met by modifying the frequency of the signals issuing from mixer 6 by operating on the frequency of secondary local oscillator 7. Oscillator 7 is of the V.C.O. type, i.e. is frequency-modulatable by means of a DC control voltage. The signal issuing from amplifier 8 is routed into a frequency discriminator 10 which delivers an output DC voltage that is a function of the difference between the signal frequency and the adjustment frequency. This voltage is amplified in a DC amplifier 11 and used to shift the frequency of V.C.O. oscillator 7 and centre the signal issuing from mixer 6 upon the pass-band of amplifier 8.

Such a device will automatically correct the frequency shift irrespective of its cause and acts as an automatic frequency control device. It is not, however, devoid of serious drawbacks.

For should the signals be cut off for any reason whatsoever, no further signals will issue from amplifier 8, and the frequency of secondary oscillator 7 will become indeterminate since the DC voltage delivered by discriminator 10 will itself become indeterminate. When reception of the signals resumes, the beat occurring in mixer 6 between the signal from amplifier 5 and the signal from oscillator 7 is very likely to fall outside the pass-band of amplifier 8, in which case discriminator 10, since it receives no signals, will not correct the frequency of oscillator 7 and reception will be interrupted.

In order to restore reception, the frequency of oscillator 7 must be deliberately varied and the frequencies scanned in an attempt to pick up the transmitted signal, if such exists.

Recourse is accordingly had to an auxiliary oscillator 13 operating at very low frequency, for instance in the region of 5 cycles per second. The voltage delivered by this auxiliary oscillator is applied to an adder 12 which also receives the voltage issuing from DC amplifier 11 referred to precedingly. The voltage issuing from adder 12 is used as the control voltage of the secondary local V.C.O. 7. Thus, if there is no signal, the frequency of secondary local oscillator 7 will vary slowly and periodically responsively to the voltage of oscillator 13 alone. As soon as a transmitted signal is picked up, the beat in mixer 6 between the signal from amplifier 5 and the signal from oscillator 7 will be effective in causing the beat signal to lie within the pass-band of intermediate frequency amplifier 8, at some stage in the variation cycle of oscillator 7. The signal is then picked up and discriminator 10 and amplifier 11 deliver an error voltage which is routed into adder 12 and operates on the frequency of secondary local oscillator 7. The very low frequency control signal from oscillator 13, which served to control the drift in secondary local oscillator 7 then assumes the form of a modulation of the DC signal issuing from amplifier 11.

If no precautions are taken, the loop consisting of elements 7–6–8–10–11–12–7 will lock onto the frequency of auxiliary oscillator 13. In order to avoid this, steps are taken so that the signal issuing from oscillator 13, which was routed through the loop formed by elements 12–7–6–8–10–11, returns to adder 12 in opposite phase to the signal issuing at that instant from oscillator 13. The addition of these oppositely phased signals in adder 12 then provides at the output thereof a modulated DC voltage of shallow modulation, and the loop performs its frequency control function as in the preceding case.

The disadvantage of a system consisting solely of elements 1 to 13 resides in the fact that, in order to enable oscillator 13 to fully perform its function of frequency sweeping when the transmitted signal is absent, it is necessary to deliver a high output voltage. This in turn, means that, when the signals are being received, some modulation of the signals issuing from amplifier 8 will subsist, which, subsequent to detection or discrimination, will be found at the output of output element 9. A signal of such magnitude can be troublesome since it will furnish strong spurious signals which could mask significant information.

One approach might be to cut off auxiliary oscillator 13 as soon as a signal is received and the control loop has become operative, for instance by using a relay controlled by the signal issuing from amplifier 8, which would be caused to undergo a detection operation. This solution cannot, however, be adopted since it would require that the relay trip-in and trip-out voltages, i.e. the signal and noise voltages, differ greatly from each other, which would not always be the case. It would further require that the sensitivity of the relay be adjusted each time as a function of the signal and noise levels to suit local conditions.

The present invention accordingly relates to means for observing and deciding whether or not to apply the sweep voltage of oscillator 13 so as not to hinder reception of significant data (see FIG. 1). In accordance with the invention, auxiliary oscillator 13 delivers at its output two very low frequency voltages in the region, for instance, of 5 cycles per second. One of these is routed to B and has a high value (700 millivolts for example), while the other is routed to A and has a low value (100 millivolts for example). The high voltage reaching B is used for the frequency sweep in the absence of a transmitted signal, while the voltage reaching A is used to produce a very light sweep should a transmitted signal be present, the very small modulation which subsists at the output of output element 9 remaining within permissible limits, as will be explained hereinafter.

The monitoring and decision means according to the invention consist of an amplifier 15, a detector 16 and a relay 17, with amplifier 15 being selective, i.e. sensitive only to those signals the frequency of which is the same as that of auxiliary oscillator 13.

To fix ideas, it will be assumed that relay 17 has a zone of uncertainty included between 55 and 65 mv.; this being so, it will definitely operate when the voltage on line C interconnecting adder 12 and oscillator 7 has a component greater than 65 mv. on the frequency of 5 c./s. of oscillator 13, which is the only frequency to pass through amplifier 15, and it will definitely trip out when that voltage drops below 55 mv.

In the absence of a transmitted signal, no signal will reach amplifier 8, hence no 5 c./s. voltage will issue from amplifier 11. Assuming that relay 17 is inoperative, then, through the agency of adder 12, it will apply to C a voltage close to 100 mv. delivered at A by auxiliary oscillator 13. Since this voltage exceeds the upper 65 mv. threshold referred to, the relay will immediately operate and apply to adder 12 the voltage in the region of 700 mv. delivered at B by auxiliary oscillator 13; a fortiori, therefore, it will hold this operative position. Secondary local oscillator 7 will consequently have its frequency vary within wide limits, thereby permitting scanning at the repetition frequency of 5 cycles per second.

This situation will continue as long as there is no transmitted signal.

Should a transmitted signal appear at any instant during the frequency variation cycle of oscillator 7, then beat will occur in mixer 6 between the signal from amplifier 5 and the signal from oscillator 7, and the frequency of this beat will be such that it falls within the pass-band of intermediate frequency amplifier 8. This signal is immediately detected by element 9 and translated into significant data. Meanwhile discriminator 10 also receives this signal from amplifier 8, monitors its frequency and delivers to DC amplifier 11 a DC error voltage having a 5 c./s. component. The voltage issuing from amplifier 11 is added in adder 12 to the voltage from oscillator 13. The 5 c./s. components of the signal from oscillator 13 and of the control signal from amplifier 11 will be oppositely phased, as stated precedingly. By "control loop gain' is to be understood the ratio of the 5 c./s. component of the voltage appearing on the coupling between amplifier 11 and adder 12 to the voltage appearing on the coupling between adder 12 and oscillator 7. Assuming this loop gain to be approximately fifty-fold—a customary value—then notwithstanding the fact that the relay is still in its operative position, the 5 c./s. voltage on the coupling between adder 12 and oscillator 7 will be only 700/50=14 mv., due to the opposite-phase mixing effected in adder 12. This voltage is well below the lower threshold of 55 mv. referred to previously. The relay will thus definitely drop out and apply to adder 12 the voltage A equal to 100 mv., whereby the 5 c./s. component subsisting on the coupling between oscillator 7 and adder 12 will then only be 100/50=2 mv. The modulation produced by this 2 mv. voltage on the signal issuing from amplifier 8 will be negligible and will not hinder the reception of significant data.

In order to avoid accidental tripping in and out of relay 17 each time the transmitted signal is interrupted, as for instance in the case of keyed transmissions, the invention provides a time constant for the system consisting of amplifier 15, detector 16 and relay 17. By way of example, this time constant could be two seconds.

Assuming then that transmission should cease, the 5 c./s. component of the voltage issuing from amplifier 11 will become null immediately since nothing would issue from intermediate frequency amplifier 8. Hence the voltage A alone will enter adder 12. This voltage is found immediately at its full 100 mv. value on the coupling between adder 12 and oscillator 7. This 100 mv. modulation may be adequate to ensure the slight frequency sweep required to lock the signal on should it reappear before the two-second time delay for closure of relay 17. When this is the case the system synchronizes instantly and reception is resumed as if transmission had never ceased.

Should the break in transmission exceed two seconds, the system consisting of amplifier 15, detector 16 and relay 17 is subjected to a voltage of 100 mv. that is greater than the upper threshold of 65 mv. referred to previously, for a duration greater than the time constant, so that relay 17 operates and applies the B voltage of 700 mv., which is effective in ensuring maximum frequency scanning. This is equivalent to the initial contingency discussed previously, i.e. the absence of transmission.

Figure 2:
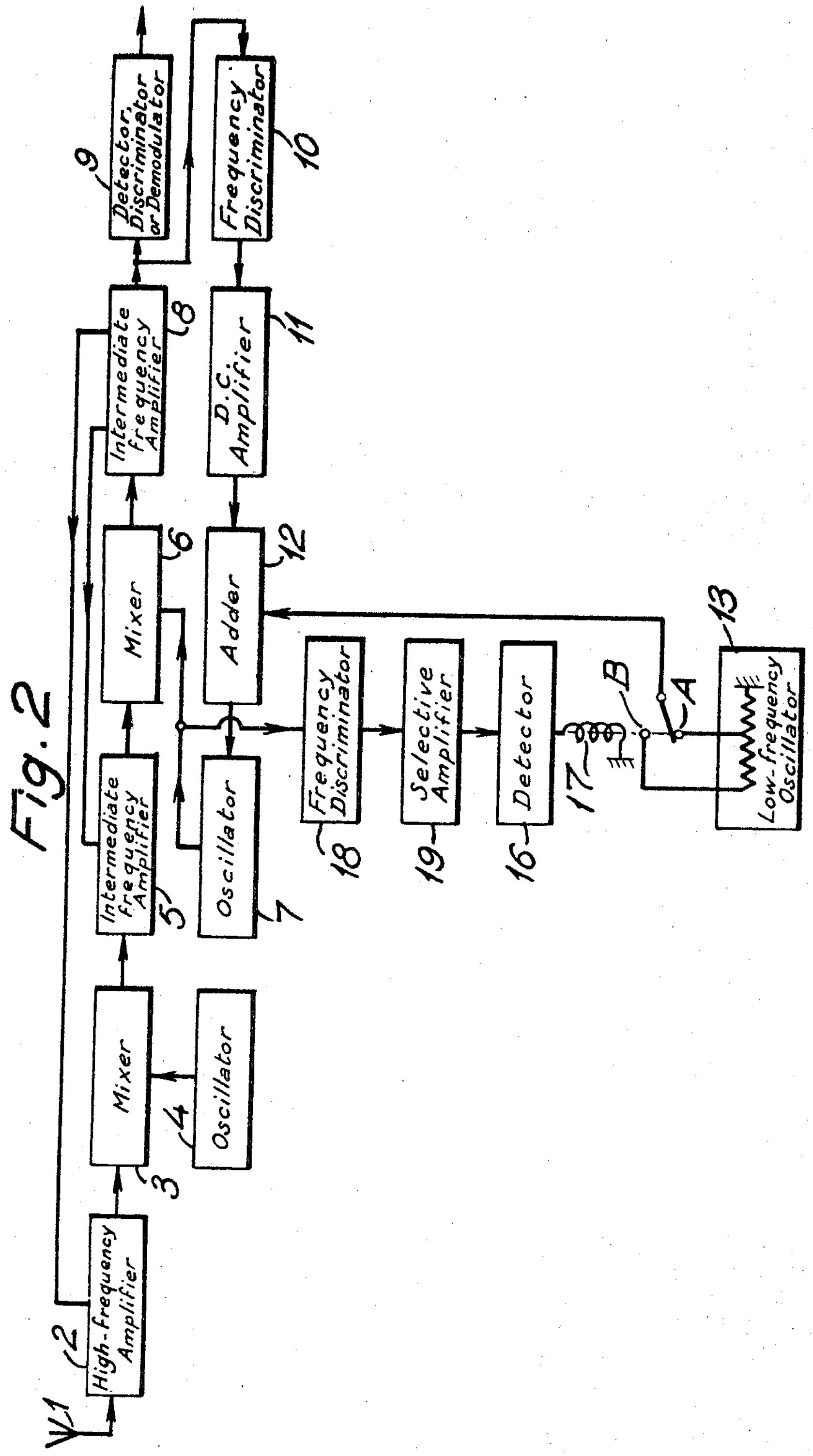
FIG. 2 is a block diagram of an alternative embodi-nent of a receiver according to the invention.

In the form of embodiment of which FIG. 2 represents a block diagram, the monitoring, decision and commutating elements according to the invention consist of a unit comprising a detector 16 and a relay 17, as above, but including in addition a frequency discriminator 18 and a selective amplifier 19 the function of which is the same as that of amplifier 15 in FIG. 1, as will be explained hereinbelow.

This unit is selective by virtue of the amplifier 19, i.e. it is responsive only to signals having the frequency of auxiliary oscillator 13, namely 5 cycles per second.

In the absence of any transmission, assuming relay 17 to be inoperative, then the latter will apply the A voltage of 100 mv., to adder 12. This voltage is alone in having a frequency of 5 c./s., since amplifier 11 delivers only a DC voltage. The secondary local oscillator 7 then sweeps, with a scanning frequency of 5 c./s., a spectrum the width of which corresponds with the V.C.O. voltage of 100 mv. This spectrum width will appear at the output of discriminator 18 in the form of a 5 c./s. modulation f the DC error signal. The 5 c./s. component of the utput signal from frequency discriminator 18 is related the 5 c./s. component issuing from adder 12 by a onversion constant. This being so, since the 5 c./s. voltges issuing from discriminator 18 of FIG. 2 and those pplied to amplifier 15 of FIG. 1 are equivalent in all ases, identical causes will produce identical effects.

FIGS. 3*a* to 3*f* are detailed representations of the ciruit diagram of an apparatus for receiving telemetry sigals transmitted by a satellite for the specific example epresented schematically in FIG. 1, with like compoents being designated by like reference numerals.

The amplifier HF2 (see FIG. 3*a*) is activated by the antenna 1 and comprises, in the conventional manner, two amplifier stages coupled through an adjustable choke 20 and each having a tuned input circuit and a tuned output circuit, with the former utilizing a transistor 21 and the latter two cascade-connected transistors 22 and 23. The base of transistor 22 is biased by a bias issuing from intermediate frequency amplifier 8 whereby to provide automatic gain control. For cases where the reception frequency spectrum is moderate, the input circuit of the first stage may be adjusted with a wide pass-band once and for all. Otherwise its capacitor 24 is made variable.

The first mixer 3 with its transistor 25 and the first high-frequency local oscillator 4 (see FIG. 3*a*) with its transistor 26 are of conventional type. The variable capacitors of amplifier 2 and of local oscillator 4 are adjusted according to the nature of the transmission to be received, so as to obtain a relatively wide frequency band of 4 mc./s., for instance, at the output of mixer 3.

Figure 3A:
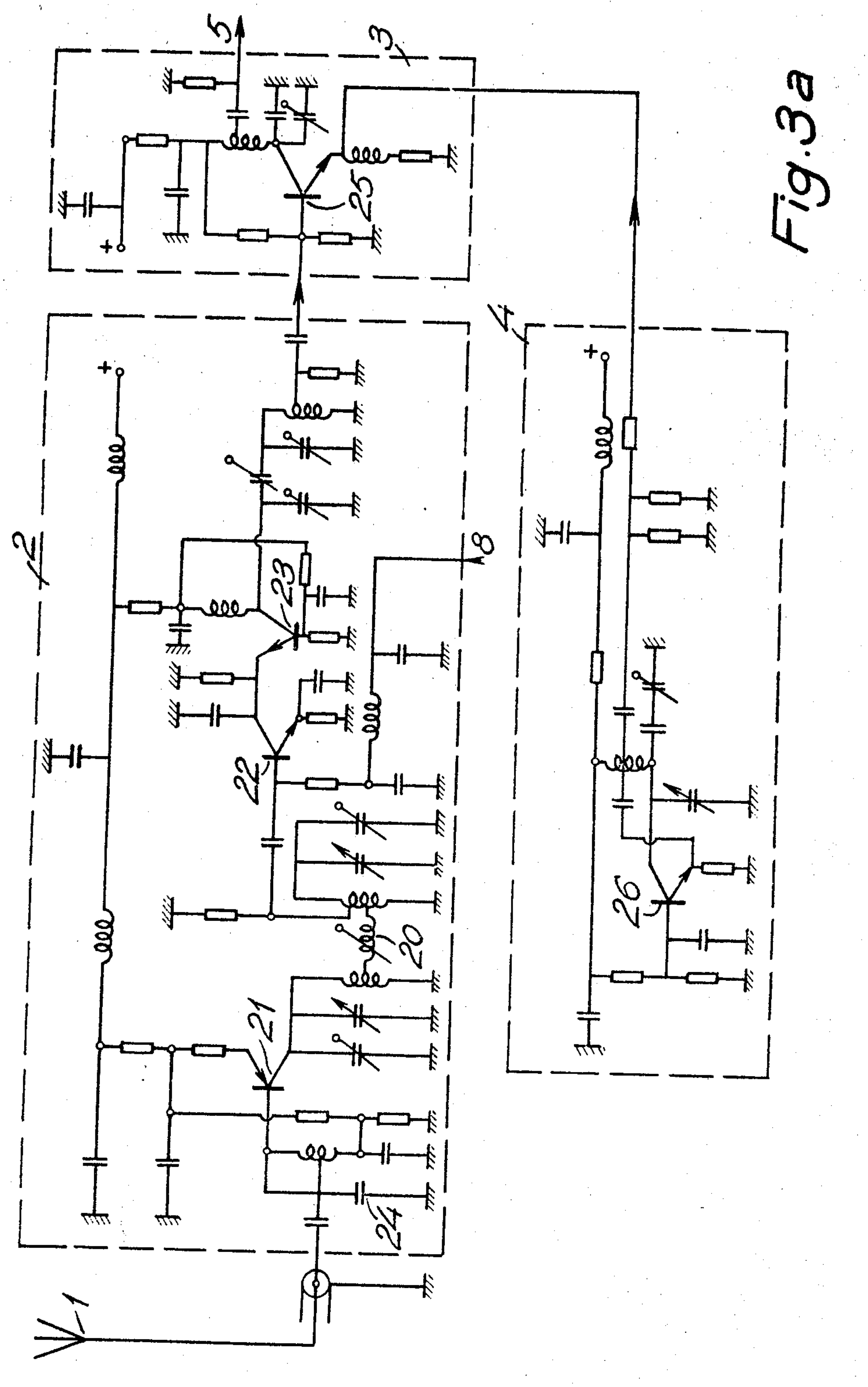
FIGS. 3*a* to 3*f* jointly represent the detailed overall :ircuit diagram for a preferred form of embodiment of the invention, for the case of a receiver designed to re-ceive telemetry signals from a missile or a satellite.
Figure 3B:
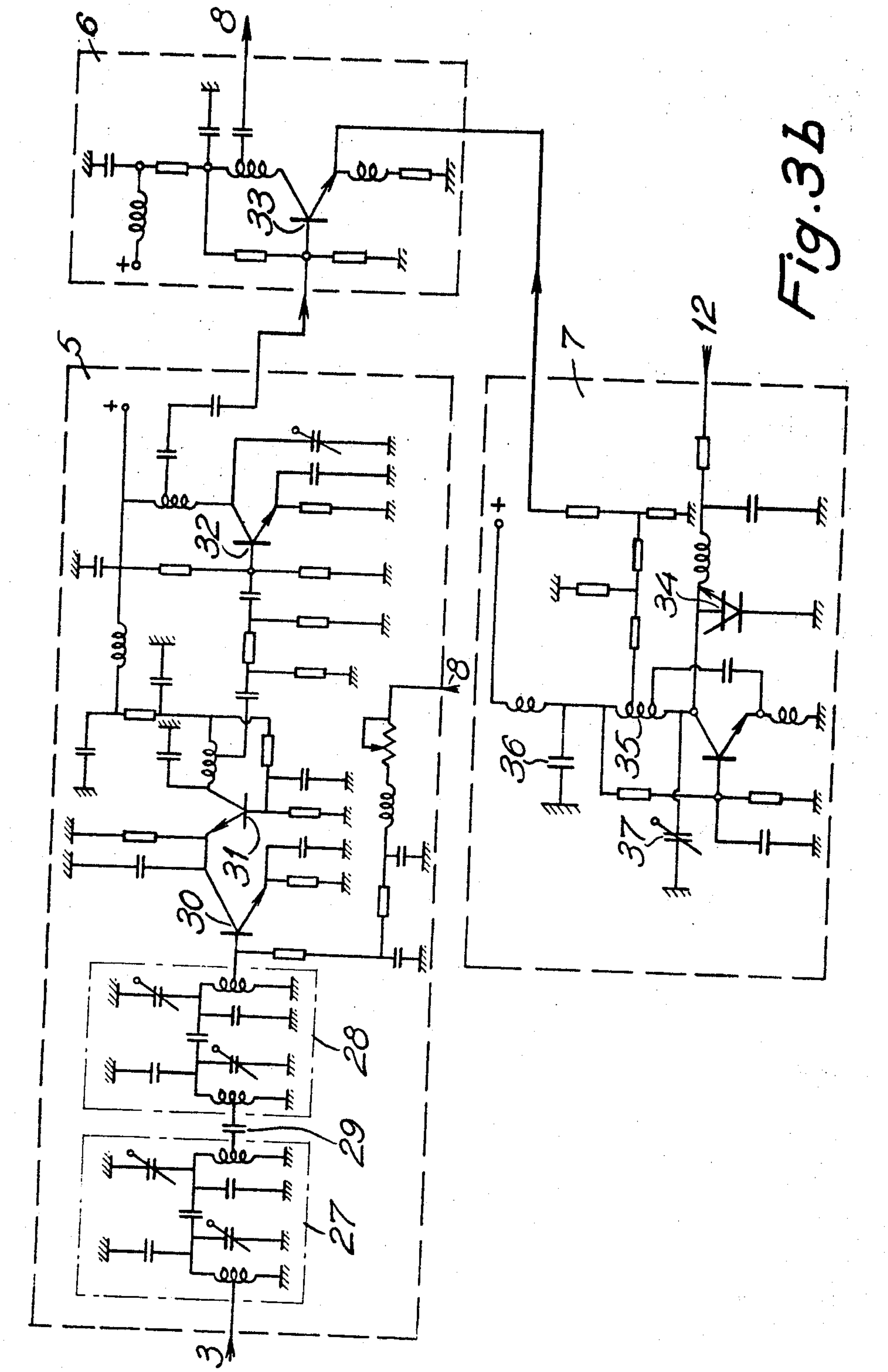
Figure 3C:
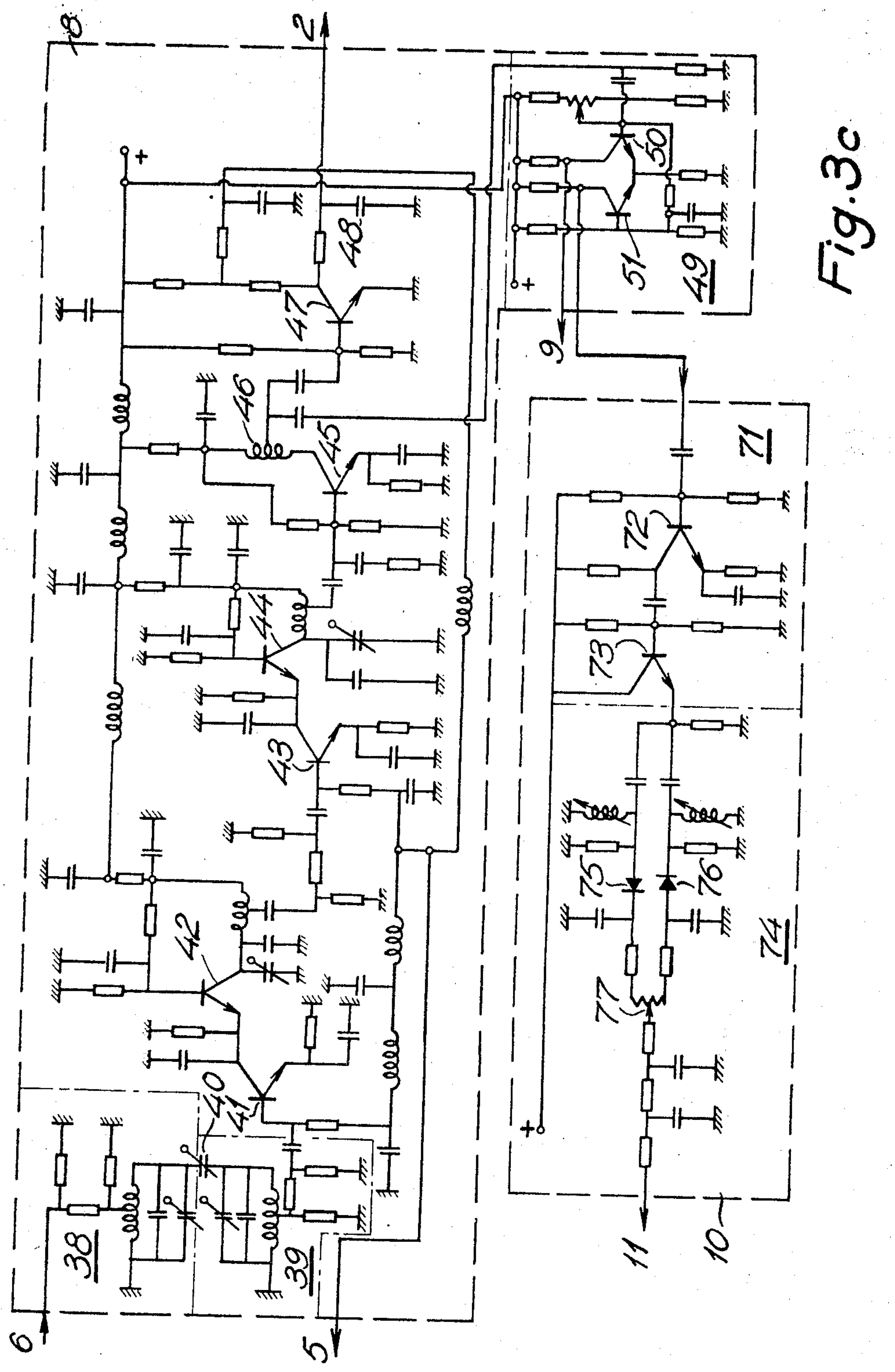
Figure 3D:
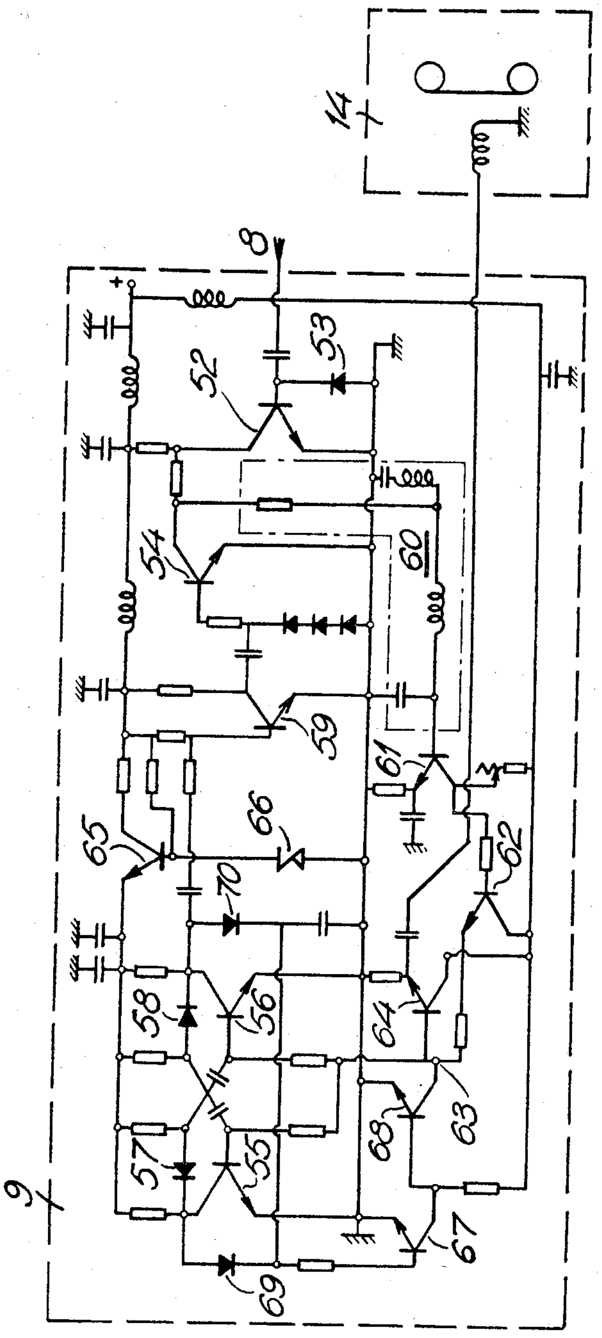
Figure 3E:
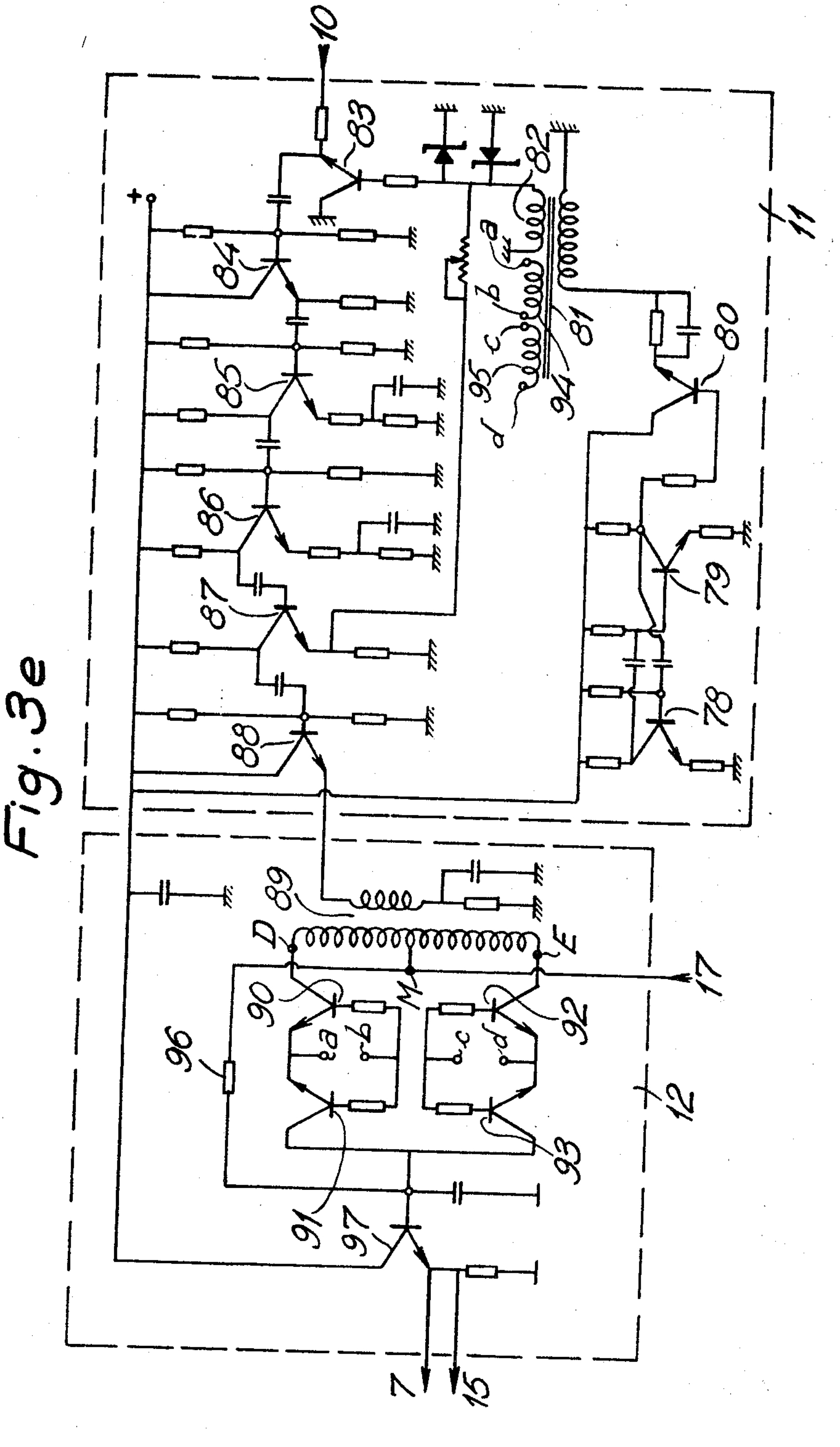
Figure 3F:
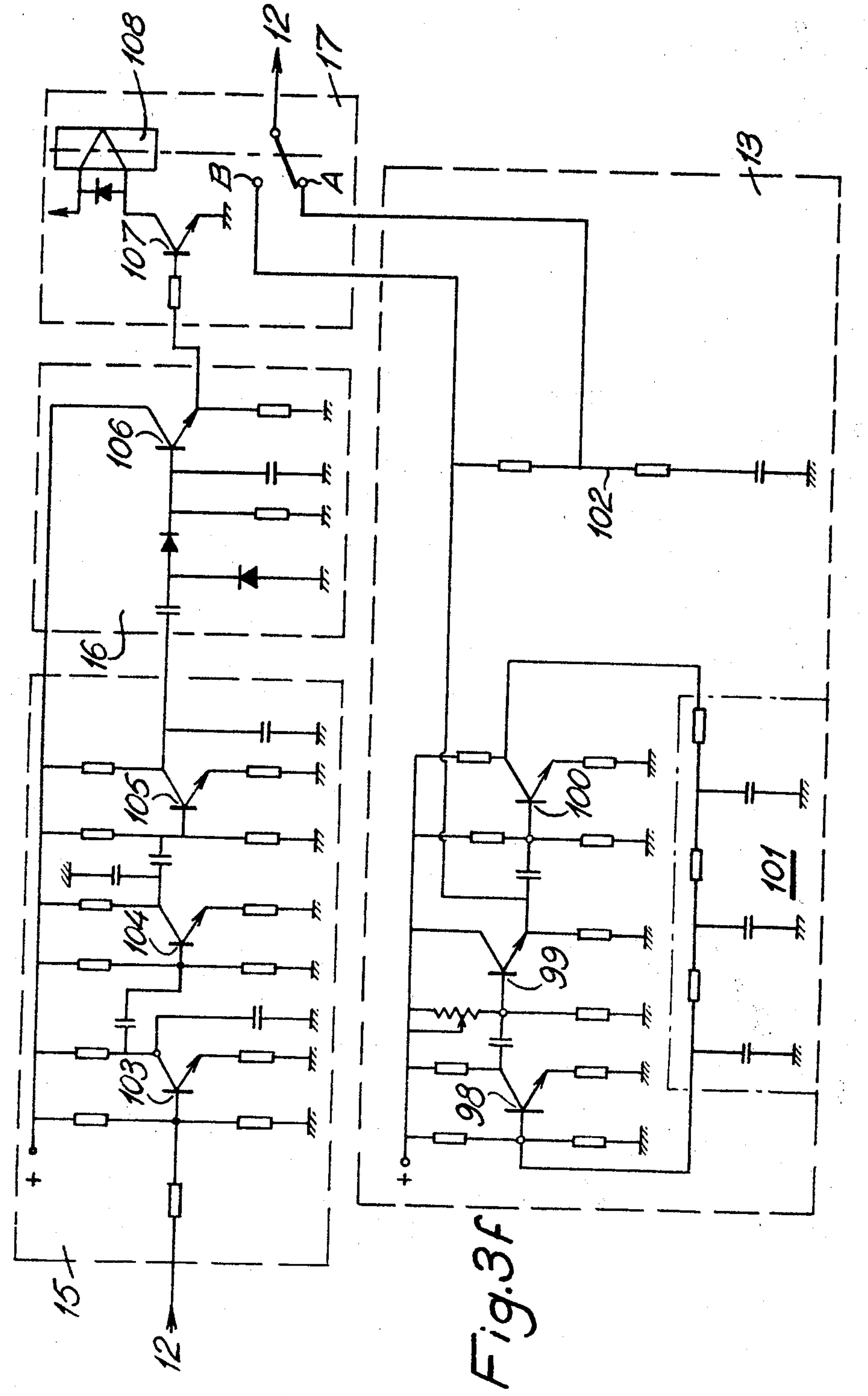

The first intermediate frequency amplifier 5 (FIG. 3*b*) receiving the signals from mixer 3 comprises at its input a narrow-band filter consisting of a number of identical cells—usually four or six—of which only two, 27 and 28, are shown in FIG. 3*b* as being coupled by a coupling capacitor 29. The output from this filter is applied to the base of a transistor 30 the bias for which is taken from intermediate frequency output amplifier 8 to provide automatic gain control and which, together with another transistor 31, constitutes a first amplification stage having a tuned output circuit. This first stage drives a second stage comprising a transistor 32 and a tuned output circuit.

Mixer 6 with its transistor 33 (FIG. 3*b*) is similar to mixer 3 of FIG. 3*a*. The second local oscillator 7 (FIG. 3*b*), which is a low frequency oscillator, is frequency-modulatable by means of a capacitor 34 which is variable as a function of the voltage and is commonly known as a "varactor." Its frequency is equal to that of its oscillating circuit which consists of a choke 35 to the terminals of which are connected a capacitor 36 on the one hand, and varactor 34 equipped with a paralleled adjustable capacitor 37, on the other hand.

The second intermediate frequency amplifier 8 (FIG. 3*c*) comprises at its input a very-narrow-band filter normally consisting of a large number of cells, of which only two, 38 and 39 are shown as being coupled by an adjustable capacitor 40. This filter drives a first amplifier stage which includes a tuned circuit and two transistors 41 and 42, of which the former has its base biased to provide automatic gain control. This stage is followed by a second substantially identical stage equipped with a tuned circuit comprising two transistors 43 and 44 of which the former has a biased base. A third amplifier stage is formed by a transistor 45 and the collector choke 46 thereof. A transistor 47 and a capacitor 48 jointly form an amplifier-detector for delivering the automatic gain control voltage off the output signal from choke 46, and this voltage is applied to amplifiers 2 and 5, as stated precedingly.

In order to obtain at the output of detector element 9 a detected level adequate to drive a magnetic tape recorder 14 (FIG. 3*d*), detector 9 is devised in the form of a demodulator, a Schmitt trigger 49 with transistors 50 and 51 being inserted between output choke 46 of amplifier 8 and demodulator 9.

Controlled-phase demodulator 9 (FIG. 3*d*) comprises at its input a reforming circuit consisting of a transistor 52 and a diode 53, which is adapted to correct distortions in the square signals from the Schmitt trigger resulting from the transmission between amplifier 8 and demodulator 9. The demodulation proper is accomplished by means of a transistor 54 performing the function of a multiplier which obtains the product of the square signals from the reforming circuit times the signals issuing from a free multivibrator consisting of two transistors 55 and 56 and two diodes 57 and 58. A transistor 59 positioned between said multivibrator and transistor 54 acts as a separator. The output from transistor 54 is connected to a filter 60 and to a DC amplifier which comprises two transistors 61 and 62 and the output of which is designated by reference numeral 63.

The voltage at the point 63 is proportional to the phase difference between the signals issuing from amplifier 8 and the free multivibrator, with the latter oscillating on a frequency which is a linear function of the potential across the point 63 and earth. The system is thus a loop system, with transistor 54 playing the part of a phase comparator and locking the frequency of the free multivibrator onto that of the incident intermediate frequency signal, by means of amplifier 61, 62. When the incident signal varies in step with the modulation, so does the voltage at the point 63, and this voltage controls a separating transistor 64 which feeds the magnetic tape-type modulation recorder 14. A transistor 65 and a Zener diode 66 stabilize and lower the supply voltage, to fluctuations of which the multivibrator oscillation frequency is highly sensitive. Two transistors 67 and 68 and two diodes 69 and 70 are connected into the system in order to avoid mis-starts of the multivibrator when it is energized.

Frequency discriminator 10 (FIG. 3*c*) comprises an amplifier stage 71 having two transistors 72, 73 and a discriminator stage 74 consisting of two parallel-connected oscillating circuits incorporating a differential diode system 75, 76 and respectively connected to a fixed tap of a potentiometer 77. These oscillating circuits are slightly frequency-shifted with respect to each other, whereby the voltage obtained across the terminals of potentiometer 77 is a function of the difference between the frequency of the signal entering discriminator 10 and a frequency which is the mean of the tune frequencies of the two oscillating circuits forming the discriminator.

The DC amplifier 11 (FIG. 3*e*) includes a local oscillator with two transistors 78 and 79 followed by a separator stage with a transistor 80 that energizes the primary winding of a transformer 81 of which one of the secondary windings 82 energizes a transistor 83 which also receives the DC voltage from discriminator 10. At the output of transistor 83 appear the square signals from winding 82 which are amplitude-modulated by the DC voltage from discriminator 10. Transistor 83 is followed by an amplification channel having four transistors 84 to 87, with transistors 83 and 87 being interconnected by a feedback line the function of which is to compensate for the residual saturation voltage of transistor 83. The output from this amplification channel is connected to a separating transistor 88 which energizes a transformer 89 of demodulator 12 that adds the voltage issuing from auxiliary oscillator 13 via relay 17 to the voltage which issues from discriminator 10 and is amplified in DC amplifier 11.

In this adder (FIG. 3*e*) the transistors 90, 91 connected to the end D of the secondary winding of transformer 89, on the one hand, and transistors 92, 93 connected to the other end E of that winding, on the other, behave as switches that are opened or closed in step with local oscillator 78, 79 of amplifier 11, responsively to the control signals tapped respectively off two secondary windings 94, 95 of transformer 81 via circuits interconnecting terminals *a, b, c* and *d*.

If the voltage issuing from frequency discriminator 10 is positive, then by connecting the secondary windings of transformer 81 in the correct sense it is possible to ensure that transistors 90, 91 be blocked and transistors 92, 93 made conductive when the voltage at the point D of the secondary winding of transformer 89 is greater than the voltage at its mid-point M and, a fortiori, than the voltage at its other end E. At the next half-wave of the signal from transformer 81, the voltages at D and E will be reversed, i.e. transistors 90, 91 will become conductive and transistors 92, 93 will be blocked. The voltage across the terminals of resistor 96 connected to the point M will then be positive. If the voltage issuing from frequency discriminator 10 is negative, then the square signals from amplifier 81 will be oppositely phased and transistors 90 to 93 will be conductive or blocked in such manner as to cause the voltage across the terminals of resistor 96 to become negative. The DC voltage from frequency discriminator 10 will thus be amplified across the terminals of resistor 81.

With a view to adding into said adder the voltage issuing from auxiliary oscillator 13 via relay 17, this voltage is applied to the mid-point M of the secondary winding of transformer 89. Resistor 96 is connected to a separating transistor 97 the emitter of which is connected to local oscillator 7 and to amplifier 15.

The low frequency auxiliary oscillator 13 (FIG. 3*f*) consists of a conventional amplifier with three stages formed by transistors 98, 99 and 100. The first and last stages are coupled by means of a weighting network 101 which also performs the function of a low-pass filter. The voltage applied to adder 12 through the agency of relay 17 is tapped off the intermediate stage transistor 99 in order to avoid the distortions and high levels to be found at the end of the channel. This voltage is applied directly to terminal B, and a lower voltage is applied to terminal A via a resistor bridge 102.

Amplifier 15 (FIG. 3*f*) is a low frequency amplifier having three stages formed by transistors 103 to 105, of which the first two are equipped with a capacitors-type filter the pass-band of which is in the region of 5 cycles per second. Detector 16 (FIG. 3*f*) is conventional and includes a transistor 106 which drives the relay 17 via an amplifying transistor 107 which narrows the gap between the trip-in and trip-out input levels of relay 108.

The automatic frequency control system according to FIGS. 1 and 2 is usable in electronic frequency-controlled receivers. Thus, apparatus of this kind for receiving radio signals can be used with advantage for receiving telemetry signals emitted from missiles or artificial satellites, as well as echoes or retransmissions from telecommunication relay satellites. Such automatic frequency control can also be employed for regulating special signal generators and for coding and transposing devices.

What we claim is:

1. In a method for automatically controlling the frequency in an electronic frequency-controlled superheterodyne receiver of the kind comprising a frequency-control of the last frequency-changer-stage through a direct control voltage issuing from the discrimination of the center frequency of the input signal and a frequency sweep in the absence of a signal through the injection of an auxiliary voltage of very low frequency into the local oscillation of said last stage, the improvement comprising, in combination, the steps of generating two differently levelled voltages at said very low frequency and of injecting into the local oscillation of said last frequency changer, either the higher voltage at said very low frequency, when no information signal is present, or the sum of the lower voltage at said very low frequency and of the DC voltage issuing from the discrimination of the received signal, when an information signal is transmitted.

2. A method according to claim 1, wherein the control voltage is selectively amplified in the range of the very low frequency and the injections of the higher and lower voltages at said very low frequency are respectively controlled by high and low levels of said control voltage, at the frequency of the very low frequency auxiliary voltage.

3. In a superheterodyne receiver comprising a frequency-changer-stage, a selective amplifier connected to the output of said stage, a local oscillator in said stage having a control terminal and an oscillation frequency which is a function of the voltage applied to said control terminal, and a frequency-control circuit connecting the output of said selective amplifier to said control terminal, said frequency control circuit comprising a frequency discriminator the input of which is connected to the output of said selective amplifier, a DC amplifier the input of which is connected to the output of said frequency discriminator, an adder having two inputs and one output, its first input being connected to said DC amplifier and its output to said control terminal, and further a very low frequency oscillator the output of which is connected to the second input of said adder, the improvement comprising a first output terminal on said very low frequency oscillator, means in the latter for providing a high-level voltage at said very low frequency on said first output terminal, a second output terminal on said very low frequency oscillator, means in the latter for providing a low but not null voltage at said very low frequency on said second output terminal, and means for connecting said first output terminal to the second input of said adder when no information signal is present and for connecting said second output terminal to the second input of said adder when an information signal is transmitted.

4. In a superheterodyne receiver comprising a frequency-changer-stage, a selective amplifier connected to the output of said stage, a local oscillator in said stage having a control terminal and an oscillation frequency which is a function of the voltage applied to said control terminal, and a frequency-control circuit connecting the output of said selective amplifier to said control terminal, said frequency control circuit comprising a frequency discriminator the input of which is connected to the output of said selective amplifier, a DC amplifier the input of which is connected to the output of said frequency discriminator, an adder having two inputs and one output, its first input being connected to said DC amplifier and its output to said control terminal, and a very low frequency oscillator the output of which is connected to the second input of said adder, the improvement comprising a first output terminal on said very low frequency oscillator, means in the latter for providing a high-level voltage at said very low frequency on said first output terminal, a second output terminal on said very low frequency oscillator, means in the latter for providing a low but not null voltage at said very low frequency on said second output terminal, and selective commutation means responsive to a frequency range including the frequency range of said very low frequency oscillator, said means connecting said first output terminal to the second input of said adder when the voltage at the frequency of said very low frequency oscillator on said control terminal is high and connecting said second output terminal to the second input of said adder when the voltage at the frequency of said very low frequency oscillator on said control terminal is low.

5. A superheterodyne receiver according to claim 4, wherein said selective commutation means responsive to a frequency range including the frequency range of said very low frequency oscillator comprise a commutator, a relay operatively connected to said commutator, and a selective circuit responsive to the frequency of said very low frequency oscillator and interposed between said relay and said control terminal.

6. A superheterodyne receiver according to claim 5, wherein said selective circuit comprises in series an amplifier which is only responsive to signals having substantially the frequency of the signals of said very low frequency oscillator and a detector the output of which is operatively connected to said relay.

7. A superheterodyne receiver according to claim 5, wherein said relay is of the time-delay type.

8. In a superheterodyne receiver comprising a frequency-changer-stage, a selective amplifier connected to the output of said stage, a local oscillator in said stage having a control terminal and an oscillation frequency which is a function of the voltage applied to said control terminal, and a frequency-control circuit connecting the output of said selective amplifier to said control terminal, said frequency control circuit comprising a frequency discriminator the input of which is connected to the output of said selective amplifier, a DC amplifier the input of which is connected to the output of said frequency discriminator, an adder having two inputs and one output, its first input being connected to said DC amplifier and its output to said control terminal, and further a very low frequency oscillator the output of which is connected to the second input of said adder, the improvement comprising a first output terminal on said very low frequency oscillator, means in the latter for providing a high-level voltage at said very low frequency on said first output terminal, a second output terminal on said very low frequency oscillator, means in the latter for providing a low but not null voltage at said very low frequency on said second output terminal, and selective commutation means responsive to a frequency range including the frequency range of said very low frequency oscillator, said means connecting said first output terminal to the second input of said adder when the frequency sweep at the output of said local oscillator is high and connecting said second output terminal to the second input of said adder when the frequency sweep at the output of said local oscillator is low.

9. A superheterodyne receiver according to claim 8, wherein said selective commutation means responsive to a frequency range including the frequency range of said very low frequency oscillator comprise a commutator, a relay operatively connected to said commutator, a discriminator the input of which is connected to the output of said local oscillator and a selective circuit responsive to the frequency of said very low frequency oscillator and interposed between said relay and the output of said discriminator.

10. A superheterodyne receiver according to claim 9, wherein said selective circuit comprises in series an amplifier responsive only to signals having substantially the same frequency as the signals of said very low frequency oscillator and a detector connected to said relay.

11. A superheterodyne receiver according to claim 9, wherein said relay is of the time-delay type.

References Cited

UNITED STATES PATENTS

| | | |
|---|---|---|
| 2,647,994 | 9/1953 | Weiss. |
| 2,884,519 | 4/1959 | Masselin. |

WILLIAM C. COOPER, *Primary Examiner.*

W. A. HELVESTINE, *Assistant Examiner.*

U.S. Cl. X.R.

325—321, 346, 416, 417, 419